United States Patent Office 3,720,575
Patented Mar. 13, 1973

3,720,575
MANUFACTURE OF FIBRE-REINFORCED
CARBON BODIES
Frederick Claud Cowlard, Towcester, England, assignor to Beckwith Carbon Corporation, Van Nuys, Calif.
No Drawing. Filed Feb. 3, 1971, Ser. No. 112,479
Claims priority, application Great Britain, Feb. 6, 1970, 5,863/70
Int. Cl. B32b 5/16
U.S. Cl. 161—170                    7 Claims

ABSTRACT OF THE DISCLOSURE

A mechanical strength of a carbon body made by carbonization of a phenolic resin body, which may be so-called vitreous carbon, is greatly increased by embodying therein pre-stressed carbon fibres. Pre-stressing of these fibres is preferably effected by embodying in the phenolic body, prior to its carbonization, fibres made from acrylonitrile whose normal carbonization process has been conducted only to the stage of oxidising the fibres while they are under tension. During the subsequent carbonization of the resin the fibres will shrink more than the resin, thereby producing pre-stressing, or assisting previously mechanically applied pre-stressing, of the fibres in the resulting carbon body.

---

This invention relates to the manufacture of carbon bodies reinforced by embedded carbon fibres. According to my co-pending patent application Ser. No 219,521, filed Jan. 20, 1972 which is a continuation-in-part of application Ser. No. 59,017, filed July 28, 1970, now abandoned a bonded carbon-fibre body is made by arranging carbon fibres in a matrix of thermosetting synthetic resin, particularly phenol-aldehyde resin, and, after heat-curing the resin in a customary manner, the heat treatment of the thermosetting resin is extended beyond its normal curing temperature to convert the synthetic resin into carbon material; the heat treatment may be arranged to reach the temperature of about 1800° C. at which the formation of true vitreous carbon is completed, or it may be carried only to a temperature which though well above the curing point of the resin, may be well below the temperature of 1800° C. required for the completion of conversion of the synthetic resin to vitreous carbon, and by inserting into the resin textile or other synthetic fibres in a partly-fired condition, a reinforced carbon body in which the reinforcing carbon fibres are prestressed for tension can be produced, provided that the firing of the resin body is extended to a temperature sufficient to convert the fibres to carbon fibres and that the material for the resinous body is so chosen as to shrink less during the heat treatment than the fibre material.

The present invention proposes generally to provide a carbon body reinforced with carbon fibres, whose strength is increased by the fact that the fibres are put in tension. Apart from the method just described this may be achieved by using partially carbonised fibres which in the case of fibres made from polyacrylonitrile, are taken after the oxidation stage, which is carried out while the fibres are under tension, loading them into a phenolic resin and then firing the composite. This will ensure that during firing shrinkage of the fibres will be greater than that of the matrix, thus keeping the fibres under tension in the matrix. Alternatively or in addition the whole of the curing and carbonisation processes of the synthetic resin may be carried out with the carbon fibres put in tension by external means applying a mechanical force.

The system of firing a composite product containing partially cured carbon fibres in a resinous matrix is believed to have the particular advantage that bonding between the fibres and the matrix is more likely to occur by pairing of the unpaired electrons created during the firing, and is expected to result in a product of particularly great strength capable of operating at temperatures in excess of 300° C.

EXAMPLE I

In order to produce vitreous carbon reinforced with prestressed carbon fibres, a quantity of fibres made from polyacrylonitrile, which have already been subjected to the initial stages of conversion into carbon fibres up to and including the stage of oxidising the fibres while they are under tension, is laid-out in the form of a mat in a tray coated with polypropylene sheet and is soaked with a solution of 40% formaldehyde. Excess of the solution is poured off, and a solution of a novolak resin with a phenol formaldehyde ratio of 1:1 is added to cover the layer of carbon fibres. Additional layers of fibres are positioned on top of this first layer, and each of these layers is covered with a layer of the same novolak resin. The tray is then heated to a temperature of 90° C. for 24 hours, during which time the fibres are allowed to settle under the influence of gravity. Excess resin is then poured off, leaving just sufficient resin to completely cover the fibre layers. The resin is then cured by heating on a schedule to 160° for 7 days. If the fibres are randomly oriented, a loading of 40% is likely to be achieved, and if all fibres are oriented in the same direction, the loading can be increased to approximately 50%. The fibre composite is then heated above the normal curing temperature to a temperature of approximately 800° C, at a rate sufficiently low to ensure conversion of the resin of the matrix to vitreous carbon. During this heating process the conversion of the polyacrylonitrile fibres to carbon fibres is also completed and the oxidised fibre will shrink more than the resin, with the result that the fibre is kept in tension in the finished matrix.

EXAMPLE II

In order to produce carbon material of even greater strength, though somewhat inferior resistance to heat and chemical attack, the method of Example I is modified by limiting the further heating of the composite body after completion of the curing to a maximum temperature which, while at least equal to the temperature of about 1100° C. required for completing the conversion of the fibres into carbon fibre, is lower than the temperature of 1800° C. at which conversion of the resin of the matrix into vitreous carbon would be completed, for example by limiting this further heating to a maximum temperature of 1150° C.

This will result in the production of a largely carbonised matrix reinforced with carbon fibres which, due to their greater contraction, are under tension in the matrix and thus in the formation of a composite body having a high transverse strength and high elastic deformability.

EXAMPLES III–IV

The methods of Example I and Example II respectively are modified by substituting for the quantity of loosely arranged fibres a system of pre-arranged fibres mounted in a frame under longitudinal tension and placing and maintaining the fibres thus tensioned by these mechanical means during the whole of the curing and carbonising processes of the resin matrix.

EXAMPLES V–VI

The methods of Example III and Example IV are modified by substituting aligned high-modulus carbon fibres for the partly converted polyacrylonitrile fibres of Examples III and IV.

What we claim is:

1. A carbon body consisting of a carbon matrix which is reinforced by carbon fibres which are embedded therein under tensile stress so that the material of the matrix is under compressive stress.

2. A method of making a carbon body reinforced with carbon fibres that are under tensile stress, which comprises the steps of arranging fibres of organic material which have been subjected to oxidising heat treatment under tensile stress so as to be convertible by further heat treatment into carbon fibres under longitudinal shrinkage in a matrix of thermosetting synthetic resin which, when subjected to such further heat tratment, is subject to less shrinkage than the said fibres, curing the resin of the matrix, and subjecting the cured body to heat treatment to a temperature sufficient to convert the fibres into carbon fibres.

3. A method as claimed in claim 2, wherein the fibres employed are fibres made from acrylonitrile which have already been subjected to the initial stages of conversion to carbon fibres up to and including a stage of oxidising the fibres while they are under tension but which require further heating to be converted into carbon fibres.

4. A method as claimed in claim 2, which includes the step of mechanically tensioning said fibres before curing the matrix and maintaining the fibres under mechanically applied tension while the matrix is being cured and while the cured body is subjected to heat treatment to convert the fibres into carbon fibres.

5. A method of making a carbon body reinforced with carbon fibres that are under tensile stress, which comprises the steps of arranging, in a matrix of thermosetting synthetic resin, carbon fibres or fibres of organic material which are convertible by heat treatment into carbon fibres, mechanically tensioning said fibres and curing the resin of the matrix while maintaining the fibres under mechanically applied tension, and subjecting the cured body to heat treatment to convert the cured body into a carbon body reinforced by carbon fibres while maintaining the fibres under mechanically applied tension.

6. A method as claimed in claim 5, wherein aligned high-modulus carbon fibres are employed.

7. A method as claimed in claim 5, wherein the fibres employed are fibres made from acrylonitrile which have already been subjected to the initial stages of conversion to carbon fibres up to and including a stage of oxidising the fibres while they are under tension but which require further heating to be converted into carbon fibres.

References Cited

UNITED STATES PATENTS

| | | | |
|---|---|---|---|
| 3,412,062 | 11/1968 | Johnson et al. | 260—37 |
| 3,233,014 | 2/1966 | Bickerdike et al. | 264—29 |
| 3,462,289 | 8/1969 | Rohl et al. | 117—46 |
| 3,576,769 | 4/1971 | Hirsch | 8—115.5 X |

WILLIAM A. POWELL, Primary Examiner

U.S. Cl. X.R.

8—115.5; 117—46; 156—85, 160; 264—29